US009000322B2

(12) United States Patent
Barnett et al.

(10) Patent No.: US 9,000,322 B2
(45) Date of Patent: Apr. 7, 2015

(54) METHOD FOR STARTING AND STOPPING A PLASMA ARC TORCH

(75) Inventors: Daniel Wayne Barnett, Plainfield, NH (US); Nakhleh A. Hussary, Grantham, NH (US)

(73) Assignee: Victor Equipment Company, Denton, TX (US)

( * ) Notice: Subject to any disclaimer, the term of this patent is extended or adjusted under 35 U.S.C. 154(b) by 755 days.

(21) Appl. No.: 13/188,264

(22) Filed: Jul. 21, 2011

(65) Prior Publication Data

US 2013/0020287 A1 Jan. 24, 2013

(51) Int. Cl.

*B23K 9/00* (2006.01)
*B23K 9/02* (2006.01)
*H05H 1/34* (2006.01)

(52) U.S. Cl.

CPC ................. *H05H 1/34* (2013.01); *H05H 1/341* (2013.01); *H05H 2001/3421* (2013.01); *H05H 2001/3436* (2013.01); *H05H 2001/3442* (2013.01); *H05H 2001/3457* (2013.01)

(58) Field of Classification Search

CPC ... H05H 1/36; H05H 1/34; H05H 2001/3468; H05H 1/3405; H05H 2001/3457; H05H 2001/3426; H05H 2001/3436; H05H 2001/3421; B23K 10/006; B23K 10/00; B23K 9/0678

USPC ............. 219/121.59, 121.39, 121.44, 121.51, 219/121.52, 121.54, 121.57, 74

IPC ........................................................ B23K 9/013

See application file for complete search history.

(56) References Cited

U.S. PATENT DOCUMENTS

| | | | | | |
|---|---|---|---|---|---|
| 5,017,752 | A | * | 5/1991 | Severance et al. | 219/121.59 |
| 5,166,494 | A | * | 11/1992 | Luo et al. | 219/121.55 |
| 5,170,033 | A | * | 12/1992 | Couch et al. | 219/121.51 |
| 5,290,995 | A | * | 3/1994 | Higgins et al. | 219/121.44 |
| 5,310,988 | A | * | 5/1994 | Couch et al. | 219/121.52 |
| 5,414,237 | A | * | 5/1995 | Carkhuff | 219/121.51 |
| 5,548,097 | A | * | 8/1996 | Couch et al. | 219/121.57 |
| 5,591,357 | A | * | 1/1997 | Couch et al. | 219/121.39 |
| 5,620,617 | A | * | 4/1997 | Borowy et al. | 219/121.54 |
| 5,695,662 | A | * | 12/1997 | Couch et al. | 219/121.39 |
| 5,756,960 | A | * | 5/1998 | Rogozinski et al. | 219/121.54 |
| 5,760,363 | A | * | 6/1998 | Hackett et al. | 219/121.44 |
| 5,796,067 | A | * | 8/1998 | Enyedy et al. | 219/121.52 |

(Continued)

FOREIGN PATENT DOCUMENTS

WO WO 92/18282 10/1992

OTHER PUBLICATIONS

International Search Report dated Dec. 13, 2012 issued in PCT/US2012/047361.

*Primary Examiner* — Dana Ross
*Assistant Examiner* — Gyounghyun Bae
(74) *Attorney, Agent, or Firm* — Kacvinsky Daisak Bluni PLLC

(57) ABSTRACT

A method of starting a plasma arc torch is provided that includes directing a pre-flow gas and a start shield gas through the plasma arc torch during generation and transfer of a plasma arc, and switching from the pre-flow gas to a plasma gas, and switching from the start shield gas to a primary shield gas after transfer of the plasma arc to a workpiece. A method of stopping a plasma arc torch is also provided that includes directing a plasma gas and a primary shield gas through the plasma arc torch during steady-state operation, and switching from the primary shield gas to a stop shield gas during ramp down of an operating current.

25 Claims, 9 Drawing Sheets

(56) References Cited

U.S. PATENT DOCUMENTS

| | | | | |
|---|---|---|---|---|
| 6,121,570 | A * | 9/2000 | Oakley et al. | 219/121.51 |
| 6,163,009 | A * | 12/2000 | Hardwick et al. | 219/121.54 |
| 6,248,972 | B1 * | 6/2001 | Yamaguchi | 219/121.39 |
| 6,326,583 | B1 * | 12/2001 | Hardwick et al. | 219/121.55 |
| 6,359,251 | B1 * | 3/2002 | Picard et al. | 219/121.57 |
| 6,960,737 | B2 * | 11/2005 | Tatham | 219/121.5 |
| 7,087,856 | B2 * | 8/2006 | Eldridge | 219/121.54 |
| 7,326,875 | B2 * | 2/2008 | Krink et al. | 219/121.59 |
| 7,375,303 | B2 * | 5/2008 | Twarog | 219/121.52 |
| 7,754,996 | B2 * | 7/2010 | Brandt et al. | 219/121.49 |
| 2006/0091115 | A1 * | 5/2006 | Higgins et al. | 219/121.5 |
| 2006/0163216 | A1 | 7/2006 | Brandt et al. | |
| 2010/0155376 | A1 | 6/2010 | Lindsay et al. | |
| 2012/0261392 | A1 * | 10/2012 | Barnett et al. | 219/121.59 |
| 2013/0020287 | A1 * | 1/2013 | Barnett et al. | 219/74 |

* cited by examiner

METHOD FOR STARTING AND STOPPING A PLASMA ARC TORCH

FIELD

The present disclosure relates to plasma arc torches and more specifically to methods for starting and stopping a plasma arc.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

One of two methods is typically used for starting a plasma arc torch for initiating the pilot arc between the electrode and the tip. In a first method, commonly referred to as a "contact start," the electrode and the tip are brought into contact and are gradually separated, thereby drawing an arc between the electrode and the tip. The contact start method allows an arc to be initiated at much lower potentials since the distance between the electrode and the tip is much smaller.

In the second method, commonly referred to as a "high frequency" or "high voltage" start, a high potential is applied across the electrode and the tip, which do not make physical contact with each other, to generate a plasma arc. The process begins by supplying a pre-flow gas to the plasma chamber. Electric current (called pilot current) is then applied across the electrode and the tip to sustain the plasma arc in the gap between the electrode and the tip. The pre-flow gas forces the pilot arc out of the tip orifice, thereby facilitating arc transfer to the workpiece. When current is sensed on the workpiece, the tip is removed from the electric circuit. Thereafter, an operating current is supplied between the electrode and the workpiece to sustain the plasma arc between the workpiece and the electrode. The pre-flow gas is then switched to a plasma gas, which is ionized to generate the plasma stream for cutting, welding or gouging etc. A shield gas is also typically supplied to stabilize the plasma stream.

Application of high frequency and high voltage across the electrode and the tip, however, causes electromagnetic interference (EMI) in the surrounding environment. Moreover, the tip is subject to repetitive pilot current during arc transfer and is thus susceptible to wear. Further, the arc transfer by the conventional method is not reliable.

SUMMARY

In one form of the present disclosure, a method of starting a plasma arc torch includes: directing a pre-flow gas and a start shield gas through the plasma arc torch during generation and transfer of a plasma arc; and switching from the pre-flow gas to a plasma gas, and switching from the start shield gas to a primary shield gas after transfer of the plasma arc to a workpiece.

In another form, a method of stopping a plasma arc torch includes: directing a plasma gas and a primary shield gas through the plasma arc torch during steady-state operation; and switching from the primary shield gas to a stop shield gas during ramp down of an operating current.

In still another form, a method of operating a plasma arc torch includes: directing a pre-flow gas and a start shield gas through the plasma arc torch during generation and transfer of a plasma arc; switching from the pre-flow gas to a plasma gas, and switching from the start shield gas to a primary shield gas after transfer of the plasma arc to a workpiece; directing a plasma gas and a primary shield gas through the plasma arc torch during steady-state operation; and switching from the primary shield gas to a stop shield gas during ramp down of an operating current.

In still another form, a method of starting a plasma arc torch includes transferring a plasma arc to a workpiece without a pilot current through the use of a start shield gas flow during generation and transfer of the plasma arc that has lower ionization energy than a primary shield gas used during steady-state operation.

In still another form, a method of starting a plasma arc torch includes applying a single pulse of high voltage energy to transfer a plasma arc to a workpiece through the use of a start shield gas flow during generation and transfer of the plasma arc that has a lower ionization energy than a primary shield gas used during steady-state operation.

In still another form, a method of reducing electrode wear in a plasma arc torch includes introducing a flow of a stop shield gas through the plasma arc torch during a current ramp down period. The stop shield gas has a lower ionization energy than a primary shield gas used during steady-state operation. The stop shield gas enables the current to be ramped down to a lower level before a plasma arc is extinguished such that molten emissive element material developed in the electrode during steady-state operation is cooled and solidified to reduce ejection of the molten emissive element material from the electrode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
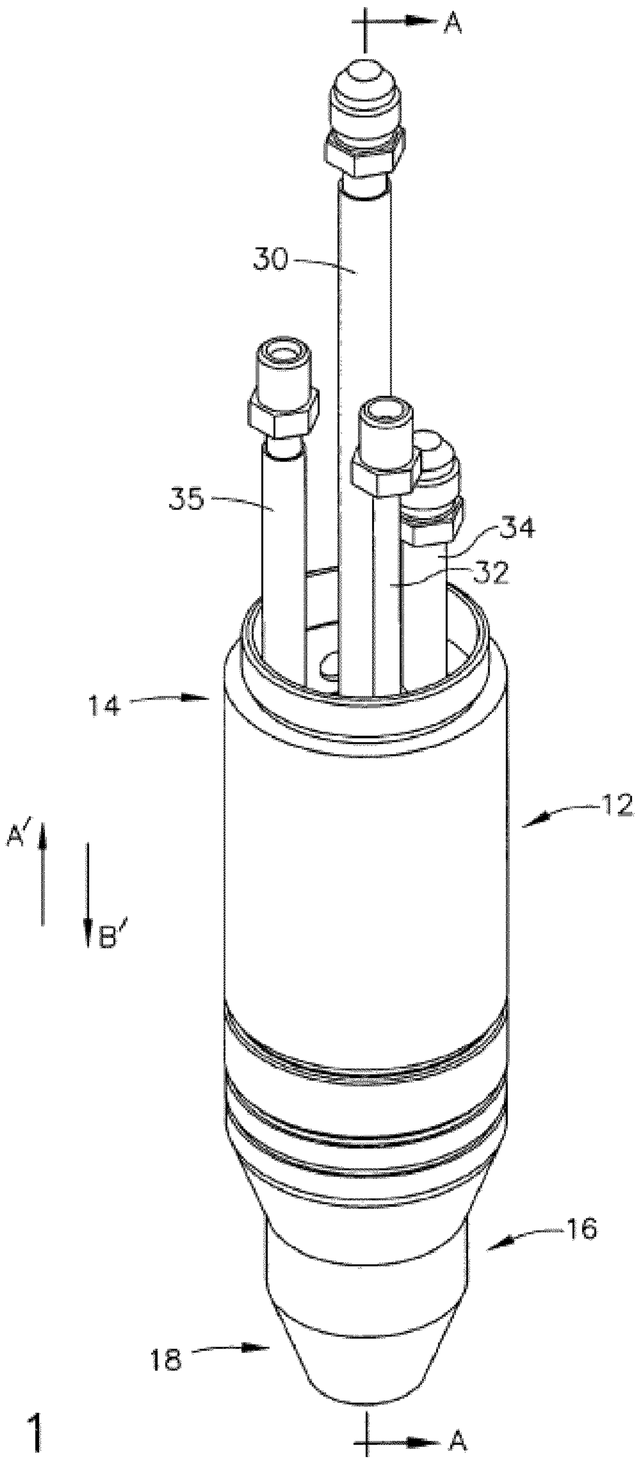
FIG. 1 is a perspective view of a prior art plasma arc torch.
Figure 2:
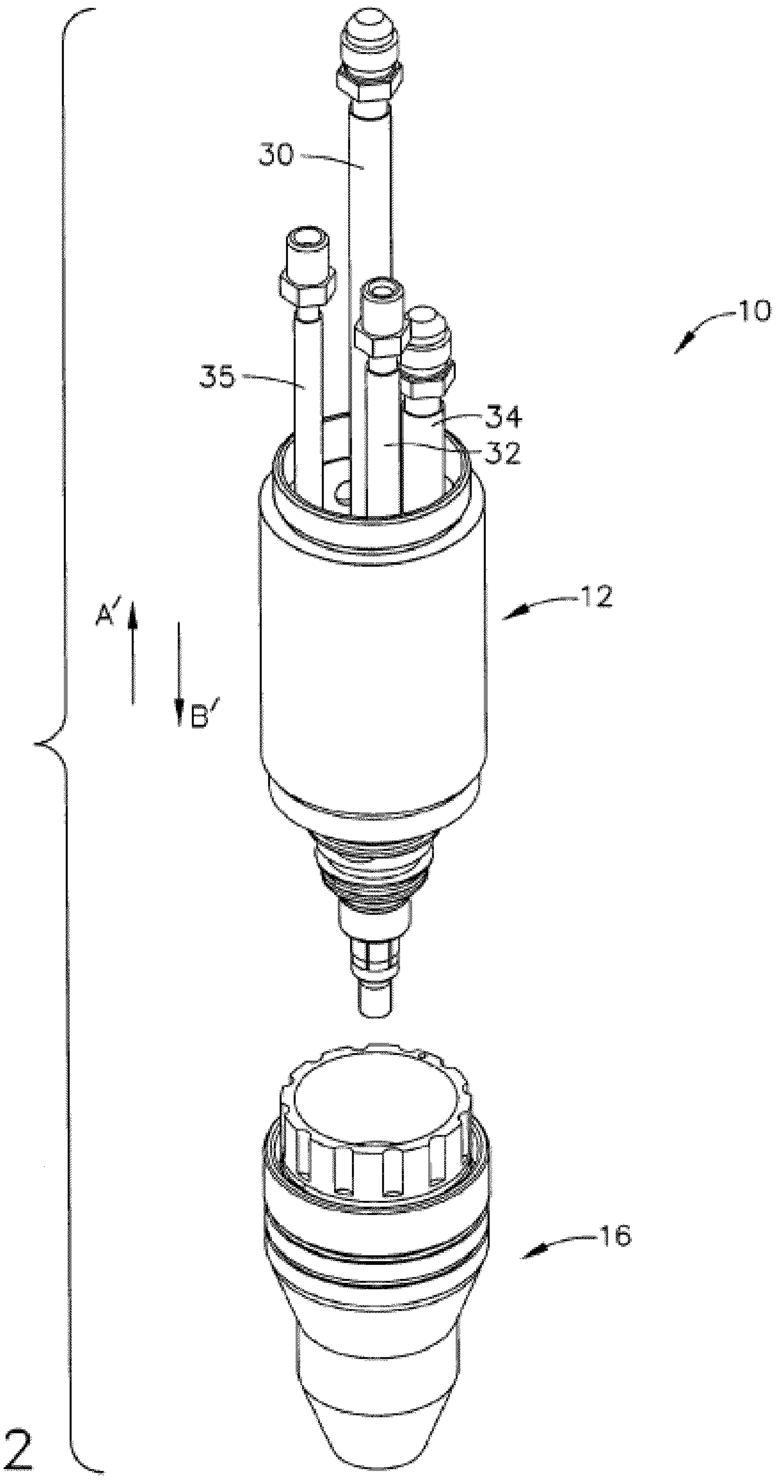
FIG. 2 is an exploded perspective view of a prior art plasma arc torch.
Figure 3:
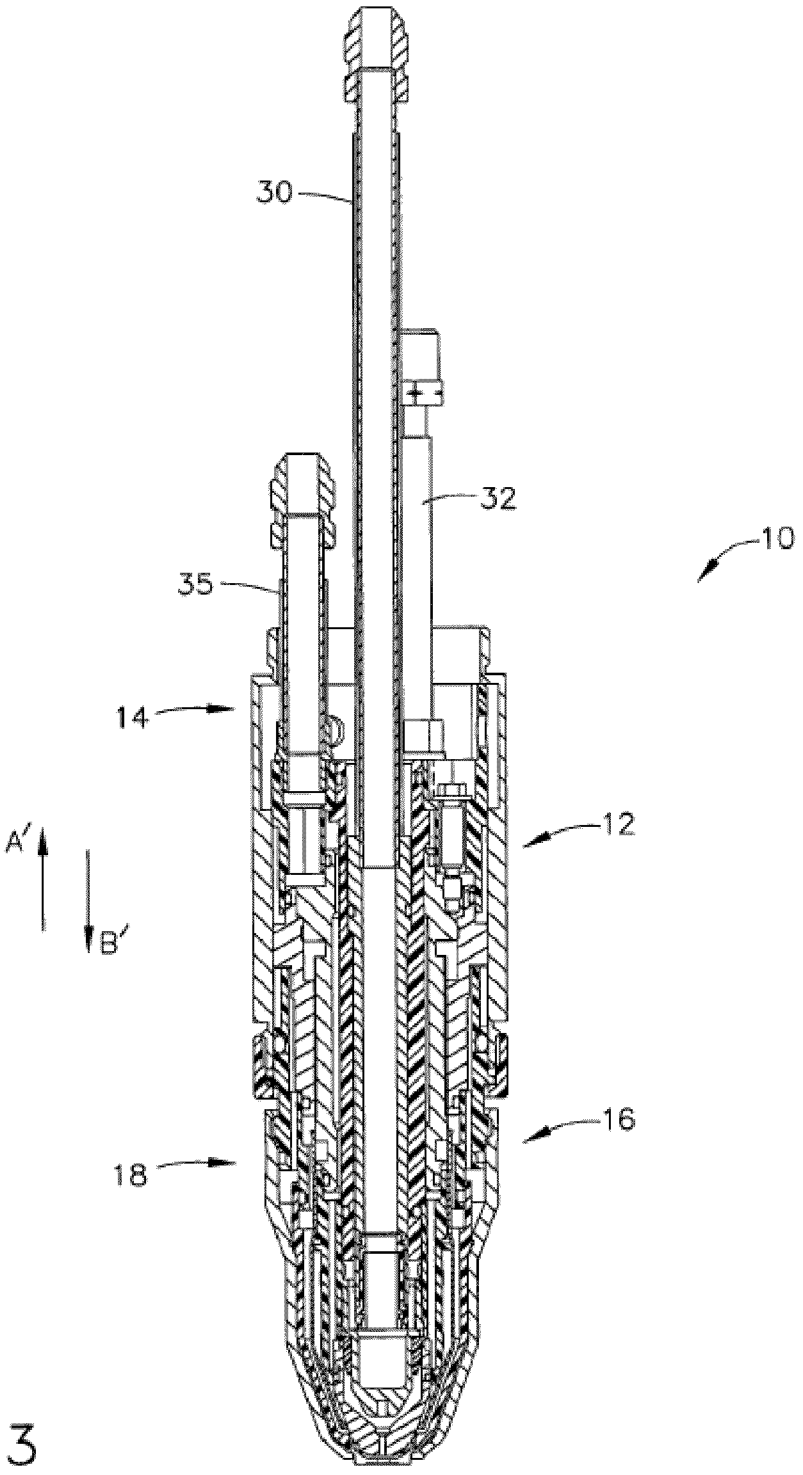
FIG. 3 is a longitudinal cross-sectional view, taken along line A-A of FIG. 1, of the prior art plasma arc torch.
Figure 4:
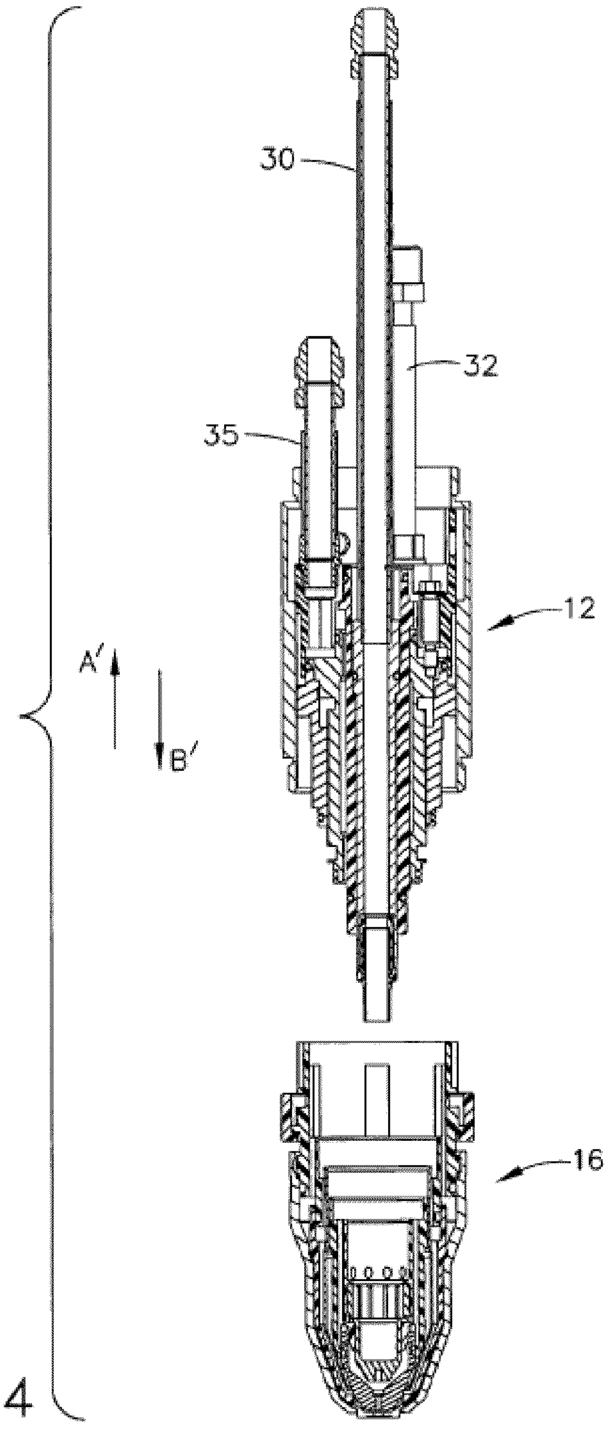
FIG. 4 is an exploded longitudinal cross-sectional view of the prior art plasma arc torch of FIG. 3.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Referring to the drawings, a plasma arc torch is illustrated and indicated by reference numeral 10 in FIG. 1 through FIG. 6. The plasma arc torch 10 generally includes a torch head 12 disposed at a proximal end 14 of the plasma arc torch 10 and a plurality of consumable components 16 secured to the torch head 12 and disposed at a distal end 18 of the plasma arc torch 10 as shown. Although an automated torch is illustrated and described herein, it should be understood that the principles of the present disclosure may also be applied to a manual plasma cutting torch while remaining within the scope of the present disclosure. Accordingly, the automated torch 10 should not be construed as limiting the scope of the present disclosure.

As used herein, a plasma arc torch should be construed by those skilled in the art to be an apparatus that generates or uses plasma for cutting, welding, spraying, gouging, or marking operations, among others, whether manual or automated. Accordingly, the specific reference to plasma arc cutting torches or plasma arc torches should not be construed as limiting the scope of the present disclosure. Furthermore, the specific reference to providing gas to a plasma arc torch should not be construed as limiting the scope of the present disclosure, such that other fluids, e.g. liquids, may also be provided to the plasma arc torch in accordance with the teachings of the present disclosure. Additionally, proximal direction or proximally is the direction towards the torch head 12 from the consumable components 16 as depicted by arrow A', and distal direction or distally is the direction towards the consumable components 16 from the torch head 12 as depicted by arrow B'.

Figure 5:
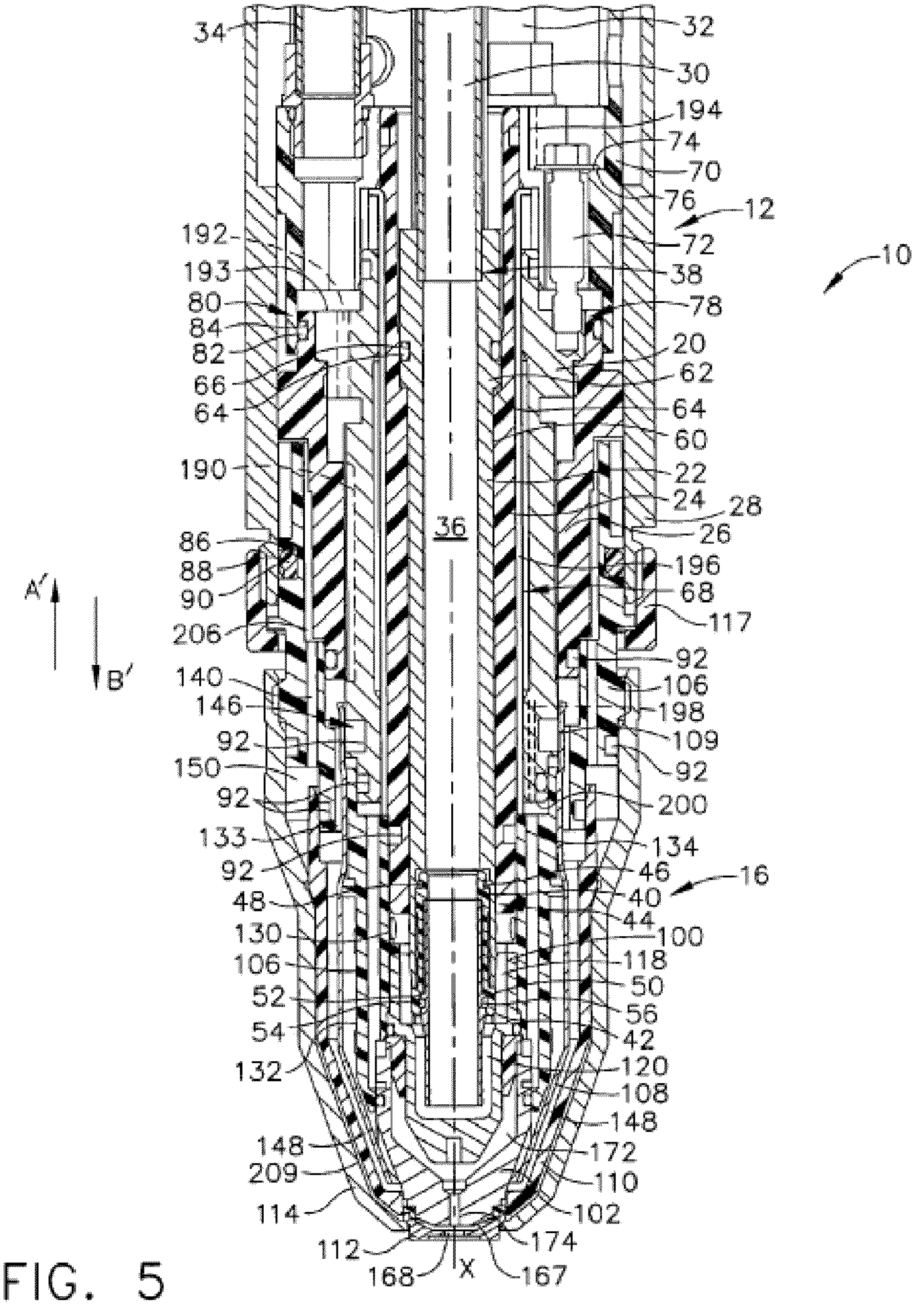
FIG. 5 is an enlarged longitudinal cross-sectional view of a distal portion of the prior art plasma arc torch of FIG. 3.

Referring to FIG. 5, the torch head 12 includes an anode body 20 that is in electrical communication with the positive side of a power supply (not shown), and a cathode 22 that is in electrical communication with the negative side of the power supply. The cathode 22 is further surrounded by a central insulator 24 to insulate the cathode 22 from the anode body 20. The anode body 20 is surrounded by an outer insulator 26 to insulate the anode body 20 from a housing 28, which encapsulates and protects the torch head 12 and its components from the surrounding environment during operation. The torch head 12 is further adjoined with a coolant supply tube 30, a plasma gas tube 32, a coolant return tube 34, and a secondary gas tube 35 (shown in their entirety in FIGS. 1 and 2), wherein plasma gas and secondary gas are supplied to and cooling fluid is supplied to and returned from the plasma arc torch 10 during operation.

The cathode 22 preferably defines a cylindrical tube having a central bore 36 that is in fluid communication with the coolant supply tube 30 at a proximal portion 38 of the torch head 12. The central bore 36 is also in fluid communication with a cathode cap 40 and a coolant tube 42 disposed at a distal portion 44 of the torch head 12. Generally, the coolant tube 42 serves to distribute the cooling fluid and the cathode cap 40 protects the distal end of the cathode 22 from damage during replacement of the consumable components 16 or other repairs.

The central insulator 24 preferably defines a cylindrical tube having an internal bore 60 that houses the cathode 22. The central insulator 24 is further disposed within the anode body 20 along a central portion 68 and also engages a torch cap 70 that accommodates the coolant supply tube 30, the plasma gas tube 32, and the coolant return tube 34. Electrical continuity for electric signals such as a pilot return is provided through a contact 72 disposed between the torch cap 70 and the anode body 20.

Figure 6:
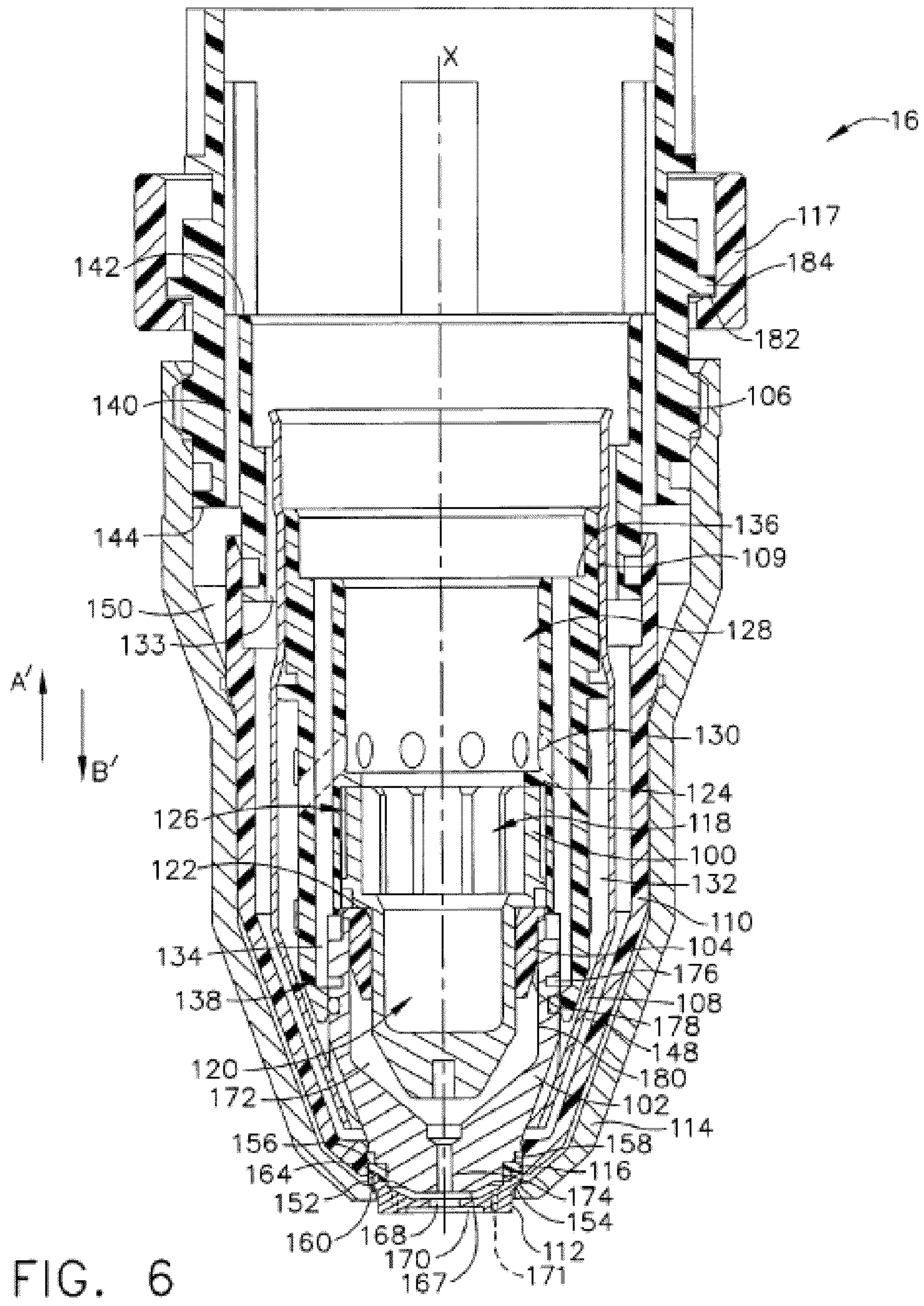
FIG. 6 is a longitudinal cross-sectional view of torch consumable components of the prior art plasma arc torch of FIG. 3.

As shown in FIG. 6, the consumable components 16 include an electrode 100, a tip 102, and a spacer 104 disposed between the electrode 100 and the tip 102, a cartridge body 106, a distal anode member 108, a central anode member 109, a baffle 110, a secondary cap 112, and a shield cap 114. The spacer 104 provides electrical separation between the cathodic electrode 100 and the anodic tip 102, and further provides certain gas distributing functions as described in greater detail below. The cartridge body 106 generally houses and positions the other consumable components 16. The cartridge body 106 also distributes plasma gas, secondary gas, and cooling fluid during operation of the plasma arc torch 10. The distal anode member 108 and the central anode member 109 form a portion of the anodic side of the power supply by providing electrical continuity to the tip 102. The baffle 110 is disposed between the distal anode member 108. The shield cap 114 forms fluid passageways for the flow of a cooling fluid. The secondary cap 112 is provided for the distribution of the secondary gas and a secondary spacer 116 that separates the secondary cap 112 from the tip 102. A locking ring 117 is disposed around the proximal end portion of the consumable components 16 to secure the consumable components 16 to the torch head 12.

The electrode 100 is centrally disposed within the cartridge body 106 and is in electrical contact with the cathode 22 (FIG. 5) along an interior portion 118 of the electrode 100. The electrode 100 further defines a distal cavity 120 that is in fluid communication with the coolant tube 42 (FIG. 5) and an external shoulder 122 that abuts the spacer 104 for proper positioning along the central longitudinal axis X of the plasma arc torch 10. The cartridge body 106 further comprises an internal annular ring 124 that abuts a proximal end 126 of the electrode 100 for proper positioning of the electrode 100 along the central longitudinal axis X of the plasma arc torch 10. In addition to positioning the various consumable components 16, the cartridge body 106 also separates anodic member (e.g., central anode member 109) from cathodic members (e.g., electrode 100) and is made of an insulative material that is capable of operating at relatively high temperatures.

For the distribution of cooling fluid, the cartridge body 106 defines an upper chamber 128 and a plurality of passageways 130 that extend through the cartridge body 106 and into an inner cooling chamber 132 formed between the cartridge body 106 and the distal anode member 108. The passageways 130 (shown dashed) may be angled radially outward in the distal direction from the upper chamber 128 (shown dashed) to reduce any amount of dielectric creep that may occur between the electrode 100 and the distal anode member 108. Additionally, outer axial passageways 133 are formed in the cartridge body 106 that provide for a return of the cooling fluid, which is further described below. For the distribution of plasma gas, the cartridge body 106 defines a plurality of distal axial passageways 134 that extend from a proximal face 136 of the cartridge body 106 to a distal end 138 thereof, which are in fluid communication with the plasma gas tube 32 (not shown) and passageways formed in the tip 102 as described in greater detail below. Additionally, a plurality of proximal axial passageways 140 are formed through the cartridge body 106 that extend from a recessed proximal face 142 to a distal outer face 144 for the distribution of a secondary gas. Near the distal end of the consumables cartridge 16, an outer fluid passage 148 is formed between the distal anode member 108 and the baffle 110 for the return of cooling fluid as described in greater detail below. Accordingly, the cartridge body 106 performs both cooling fluid distribution functions in addition to plasma gas and secondary gas distribution functions.

As shown in FIGS. 5 and 6, the distal anode member 108 is disposed between the cartridge body 106 and the baffle 110 and is in electrical contact with the tip 102 at a distal portion and with the central anode member 109 at a proximal portion. Further, the central anode member 109 is in electrical contact with a distal portion of the anode body 20. The anode body 20, the distal anode member 108, the central anode member 109, and the tip 102 form the anode, or positive, potential for the plasma arc torch 10.

The shield cap 114 surrounds the baffle 110, wherein a secondary gas passage 150 is formed therebetween. Generally, the secondary gas flows from the proximal axial passageways 140 formed in the cartridge body 106 into the secondary gas passage 150 and through the secondary cap 112 to stabilize the plasma stream exiting the secondary cap 112 in operation. The shield cap 114 further positions the secondary cap 112, wherein the secondary cap 112 defines an annular shoulder 152 that engages a conical interior surface 154 of the shield cap 114.

The secondary spacer 116 spaces and insulates the secondary cap 112 from the tip 102. As further shown, a secondary gas chamber 167 is formed between the tip 102 and the secondary cap 112, wherein the secondary gas is distributed to stabilize the plasma stream. The secondary cap 112 further comprises a central exit orifice 168 through which the plasma stream exits and a recessed face 170 that contributes to controlling the plasma stream. Additionally, bleed passageways 171 may be provided through the secondary cap 112, which are shown as axial holes although other configurations may be employed to bleed off a portion of the secondary gas for additional cooling during operation.

The tip 102 is electrically separated from the electrode 100 by the spacer 104, which results in a plasma chamber 172 being formed between the electrode 100 and the tip 102. The tip 102 further comprises a central exit orifice 174, through which a plasma stream exits during operation of the plasma arc torch 10 as the plasma gas is ionized within the plasma chamber 172. Accordingly, the plasma gas enters the tip 102 through an annular ring 176 and swirl holes 178 formed through an interior wall 180 of the tip 102.

In operation, the cooling fluid flows distally through the central bore 36 of the cathode 22, through the coolant tube 42, and into the distal cavity 120 of the electrode 100. The cooling fluid then flows proximally through the proximal cavity 118 of the electrode 100 to provide cooling to the electrode 100 and the cathode 22 that are operated at relatively high currents and temperatures. The cooling fluid continues to flow proximally to the radial passageways 130 in the cartridge body 106, wherein the cooling fluid then flows through the passageways 130 and into the inner cooling chamber 132. The cooling fluid then flows distally towards the tip 102, which also operates at relatively high temperatures, in order to provide cooling to the tip 102. As the cooling fluid reaches the distal portion of the distal anode member 108, the cooling fluid reverses direction again and flows proximally through the outer fluid passage 148 and then through the outer axial passageways 133 in the cartridge body 106. The cooling fluid then flows proximally through recessed walls 190 (shown dashed) and axial passageways 192 (shown dashed) formed in the anode body 20. Once the cooling fluid reaches a proximal shoulder 193 of the anode body 20, the fluid flows through the coolant return tube 34 and is recirculated for distribution back through the coolant supply tube 30.

Pre-Flow Gas Flow and Plasma Gas Flow

The pre-flow gas (directed during starting) or the plasma gas (directed during steady-state operation) generally flows distally from the plasma gas tube 32, through an axial passage 194 (shown dashed) in the torch cap 70, and into a central cavity 196 formed in the anode body 20. The pre-flow gas or the plasma gas then flows distally through axial passageways 198 formed through an internal distal shoulder 200 of the anode body 20 and into the distal axial passageways 134 formed in the cartridge body 106. During starting of the plasma arc torch 10, the pre-flow gas enters the plasma chamber 172 and is ionized to generate a plasma arc. During steady-state operation of the plasma arc torch 10, the plasma gas enters the plasma chamber 172 through passageways in the tip 102 to form a plasma stream as the plasma gas is ionized by the plasma arc.

Shield Gas Flow

The secondary gas, such as start shield gas, primary shield gas and stop shield gas, generally flows distally from the secondary gas tube 35 (shown in FIGS. 1 and 2) and through an axial passage 202 formed between an outer wall 204 of the torch cap 70 and the housing 28. The secondary gas then continues to flow distally through axial passageways 206 formed through an annular extension 208 of the outer insulator 26 and into the proximal axial passageways 140 of the cartridge body 106. The secondary gas then enters the secondary gas passage 150 and flows distally between the baffle 110 and the shield cap 114, through the distal secondary gas passage 209. Finally, the secondary gas enters the secondary gas plenum 167 through passageways formed in the secondary cap 112 to stabilize the plasma stream that exits through the central exit orifice 174 of the tip 102.

Figure 7:
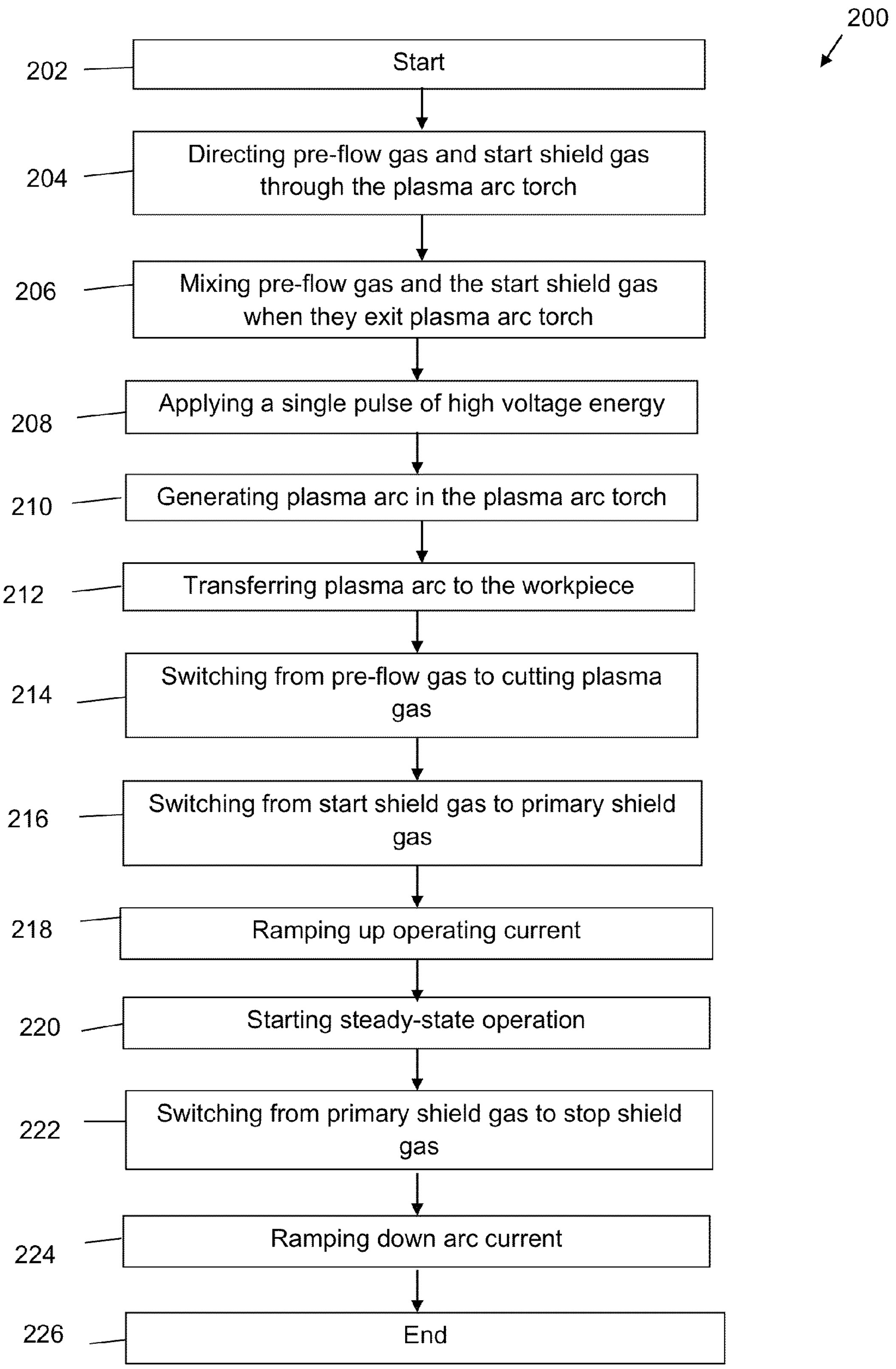
FIG. 7 is a flow diagram of a method of operating a plasma arc torch in accordance with the principles of the present disclosure.

Referring to FIG. 7, a method 200 of operating a plasma arc torch 10, which includes starting and stopping the plasma arc torch 10, starts in step 202. A pre-flow gas and a start shield gas are directed through the plasma arc torch 10 in step 204. The pre-flow gas is directed from the plasma gas tube 32 through the plasma chamber 172 and may be relatively inactive gas, such as air. The start shield gas is directed from the secondary gas tube 35, through the proximal axial passageways 140 and the secondary gas passage 150 to the secondary gas chamber 167. The start shield gas may be monatomic, such as helium, argon, or mixtures of helium and/or argon. In one form of the present disclosure, by using monatomic gas that has relatively low ionization energy as the start shield gas, the start shield gas may require less energy to be ionized. After passing through the plasma chamber 172, the pre-flow gas exits the plasma arc torch 10 through the central exit orifice 168 of the secondary gap 112. The start shield gas exits the plasma arc torch 10 through the secondary gas plenum 167. The pre-flow gas and the start shield gas are mixed as the pre-flow gas and the start shield gas exit the plasma arc torch 10 in step 206.

Next, a single pulse of high voltage energy is applied across the electrode 100 and the tip 102 in step 208. As a result, a plasma arc is generated in the gap between the electrode 100 and the tip 102, within the plasma chamber 172 in step 210. The cathode or negative potential is carried by the cathode 22 and the electrode 100. The anode or positive potential is carried by the anode body 20, the distal anode member 108, the central anode member 109, and the tip 102.

As soon as the plasma arc is generated, the plasma arc is transferred to the workpiece due to the flow of the start shield gas in step 212. As the start shield gas flows through the secondary gas chamber 167, the start shield gas, which has relatively low ionization energy in one form of the present disclosure, is ionized. The ionized shield gas flows to the workpiece and thus the arc is transferred to the workpiece and is established between the electrode 100 and the workpiece. Because of the low ionization energy of the start shield gas, no pilot current or pilot circuit is necessary to transfer the plasma arc from the plasma chamber 172 to the workpiece.

For example, a single pulse of high voltage energy of approximately 10,000 Volts may be sufficient to generate a single spark/arc between the electrode 100 and the tip 102 and the arc may be transferred to the workpiece through the flow of the start shield gas without applying a pilot current to energize the tip 102. Therefore, the single pulse of high voltage causes less electromagnetic interference to the surrounding environment as opposed to a prior art operating method where repetitive high frequency pulses are applied to the tip 102 to transfer the arc to the workpiece and cause significant electromagnetic interference.

By supplying a monatomic shield gas during arc transfer, the arc may be transferred to the workpiece at higher heights and with significantly less energy. Moreover, because only a single pulse of high voltage is applied to start the plasma arc between the electrode 100 and the tip 102 and no pilot current is applied to the tip 102 during arc transfer, tip wear is significantly reduced by using the method according to the present disclosure.

Although a lower ionization energy of the start shield gas and stop shield gas is described herein, it should be understood that other predetermined ionization characteristics of these gases may be used in order to carry out the principles of the present disclosure. Accordingly, the different gases may have predetermined different ionization characteristics in accordance with the teachings of the present disclosure.

After the plasma arc is transferred to the workpiece, the pre-flow gas is switched to a plasma gas in step 214. Concurrently, the start shield gas is switched to the primary shield gas in step 216. The plasma gas may be relatively active gas, such as oxygen, whereas the pre-flow gas may be less active gas, such as air, nitrogen, or argon. In one form, the primary shield gas has an ionization energy higher than the start shield gas and may be oxygen, nitrogen, or a mixture of oxygen and nitrogen. Alternatively, the shielding fluid may be supplied as a liquid, for example, water. The primary shield gas flows into the secondary gas plenum 167 and stabilizes the plasma stream upon exiting the central exit orifice 174 of the tip 102. As a result, a highly uniform and stable plasma stream exits the central exit orifice 168 of the secondary cap 112 for high current, high tolerance cutting operations.

Although a helium shield gas improves the starting of a plasma arc torch 10, it is not a preferred shield gas during cutting because if it is used during the entire process, gas consumption can be costly. Moreover, helium shield gas cutting typically results in lower cut speeds and reduces production efficiency. Helium shield gas will also improve transfer reliability if used as the plasma pre-flow gas, however, it has been shown to cause excessive amounts of wear at the exit of the nozzle orifice.

After the pre-flow gas and the start shield gas are switched to the plasma gas and the primary shield gas, respectively, the operating current is ramped up to a level for quality cutting in step 218. Thereafter, the plasma arc torch 10 starts a steady-state operation, such as cutting, marking, or gouging in step 220.

Once the steady-state operation has been completed, the primary shield gas is switched to a stop shield gas that has a lower ionization energy in step 222. The stop shield gas may be the same as or different from the start shield gas. For example, the stop shield gas may be monatomic and may be, for example, helium, argon or a mixture of helium and argon. The operating current is then ramped down to a lower level sufficient to maintain a plasma arc between the electrode and the workpiece in step 224. Because the stop shield gas has a relatively low ionization energy, the stop shield gas is ionized to form the plasma arc and the plasma arc remains stable during ramping down of the operating current until the plasma arc is extinguished.

Ramping down the operating current to a lower level during extinguishing advantageously protects the emissive element (for example, Hafnium) of the electrode. Conventionally, portions of the emissive element may be ejected from the electrode 100 as the plasma arc is extinguished. Portions of the emissive element may be deposited on the tip 102, which can lead to double arcing and cause tip wear. Further, when the operating current is ramped down, double arcing is likely to occur between the electrode 100 and the tip 102 to subject the tip 102 to high energy, thereby increasing tip wear and electrode wear.

In contrast, in the method of the present disclosure, when the operating current is ramped down to a lower level, the emissive element puddle may start to cool and solidify before the plasma arc is extinguished. Therefore, the emissive element cannot be ejected from the electrode 100 when the plasma arc is extinguished. The plasma arc remains stable and between the electrode and the workpiece without occurrence of double arcing.

Moreover, electrode wear is reduced by reducing electrode heating induced by pilot current. The lower level of operating current during starting and extinguishing of the plasma arc reduces wear to the consumables, such as electrode and the tip and thus increases the consumable life. The method 200 ends in step 226.

According to the method of the present disclosure, different shield gases are used during operation of the plasma arc torch 10. The start shield gas used during piloting and arc transfer may be the same or different from the stop shield gas during extinguishing the plasma arc. The start shield gas is different from the primary shield gas and is more easily ionized. Therefore, significantly less energy is required during starting and during arc transfer to transfer the pilot arc to the workpiece. A single pulse of high voltage energy is applied to transfer the plasma arc to the workpiece without high frequency pulses as generally required in a conventional method. In addition, no pilot current is applied to the plasma arc torch 10, or no pilot circuit is used, and the tip is not energized during arc transfer. No pilot arc is generated in the plasma arc torch during starting because the high frequency can be discharged directly to the workpiece to initiates transfer of the plasma arc. In the absence of a pilot current or pilot circuit and repetitive high frequency pulses, life of the consumables may be significantly improved and electromagnetic interference may be reduced. In addition, the plasma arc torch can be started from a higher height from the workpiece and the life of the tip can be improved by reducing Hafnium deposits on the tip.

Figure 8:
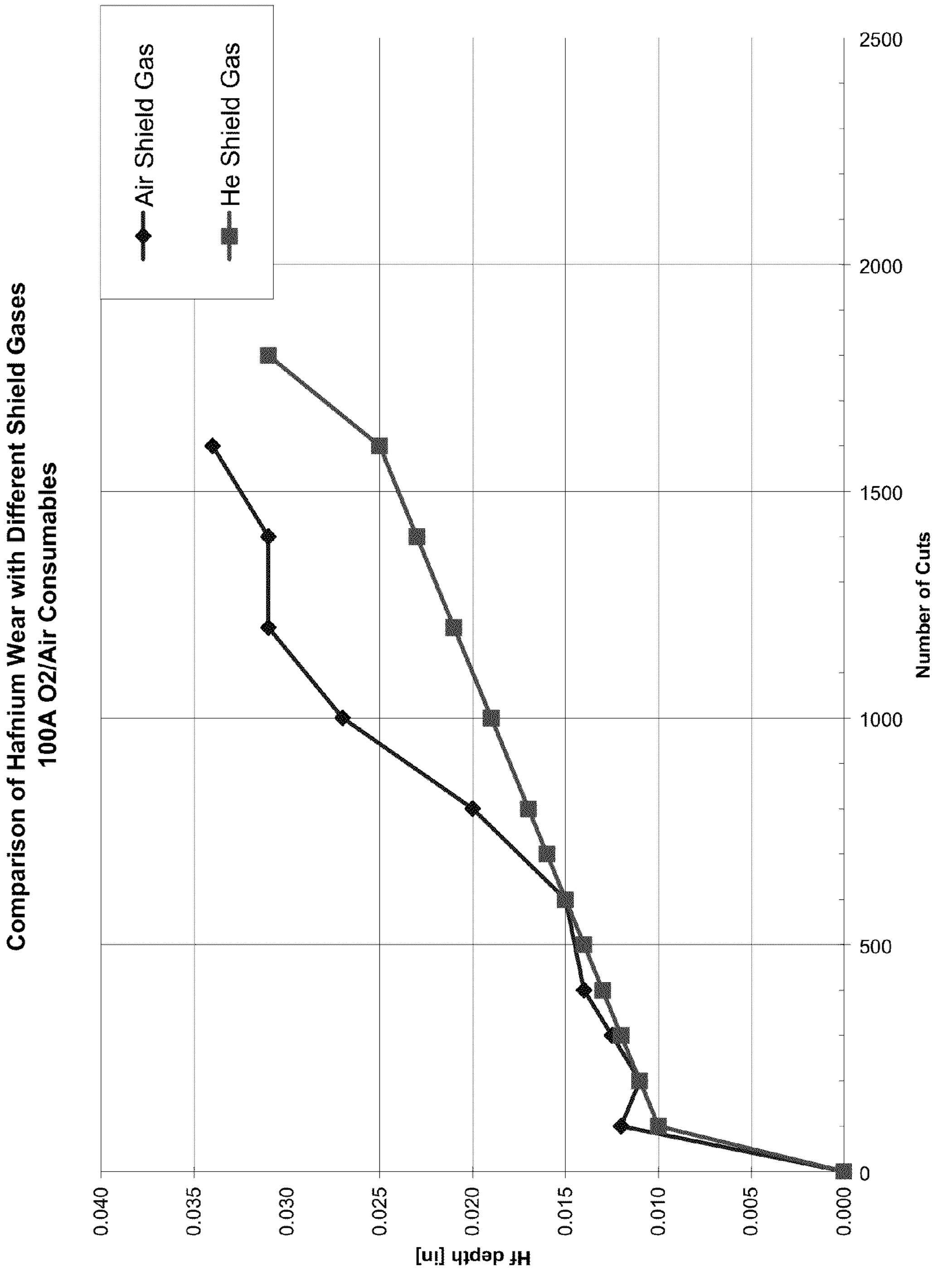
FIG. 8 is a graph illustrating reduced emissive insert wear in preliminary testing according to the principles of the present disclosure.
Figure 9:
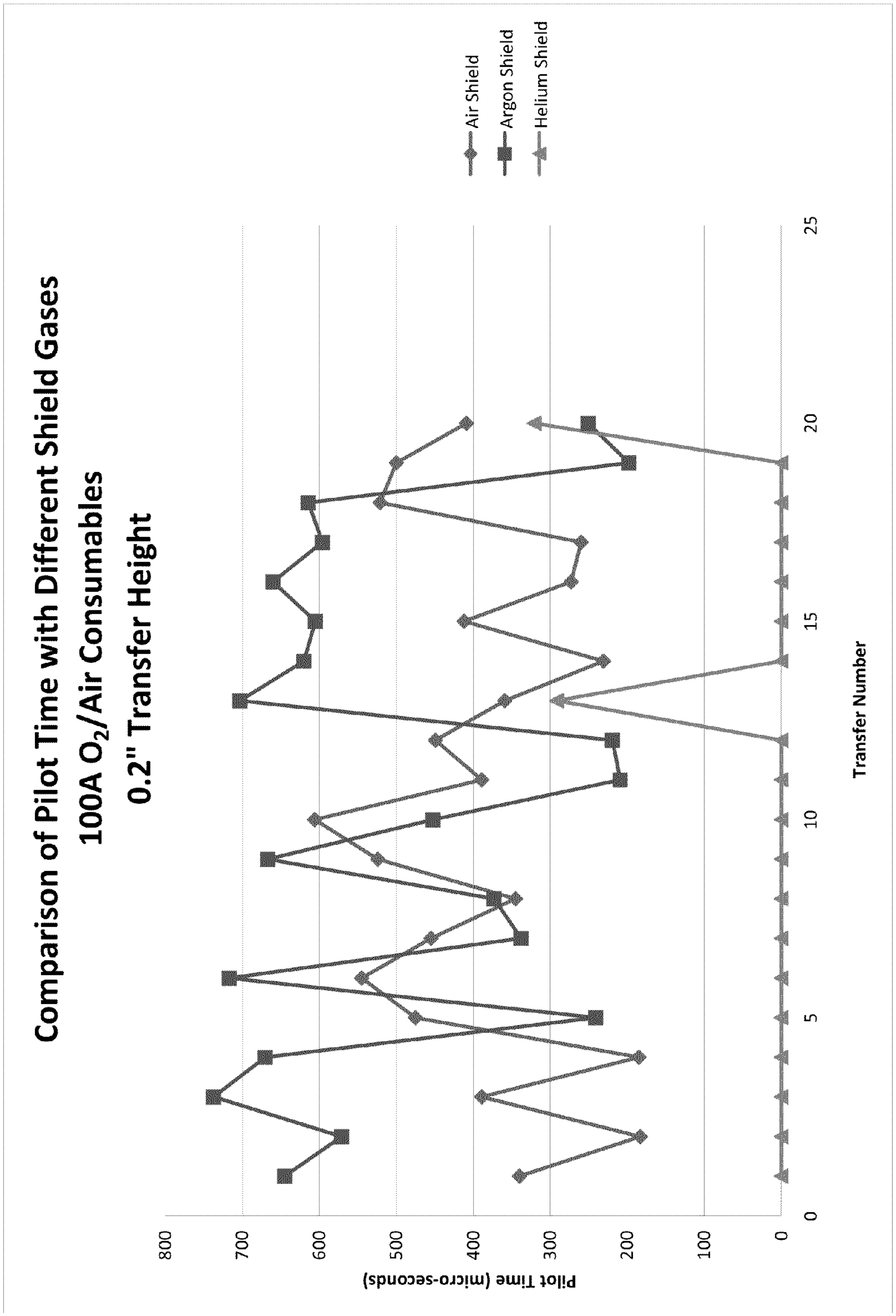
FIG. 9 is a graph illustrating reduced pilot time in preliminary testing according to the principles of the present disclosure.

In preliminary testing, as shown in FIG. 8, Hafnium wear in the electrode was significantly reduced by using a Helium shield gas in accordance with the teachings set forth above. In these tests, a 100 amp torch with air consumables was used. The pre-flow gas was air at 45 psi, the plasma gas was oxygen at 110 psi, and the shield gas flow was air or Helium (as shown on FIG. 8) at 20 psi. The torch height was about 0.200 inches from the workpiece, the pilot current was 10 amps for the Helium and 27 amps for air. As shown, after increased cycles, Hafnium wear was significantly reduced. Additionally, nozzle wear at the exit of the orifice was significantly reduced, and Hafnium deposits on the inside of the nozzle tip were also reduced. As further shown in FIG. 9, pilot time is significantly reduced with the use of the Helium shield gas as set forth herein. Accordingly, the methods according to the present disclosure provide for reduced wear on the consumables, increased transfer heights, improved arc transfer reliability, reduction in EMI, and no need for a pilot current, thus reducing the complexity of the plasma arc torch.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of starting a plasma arc torch, comprising:
- directing a pre-flow gas into a plasma chamber formed between an electrode and a tip and directing a start shield gas through a secondary gas passageway of the plasma arc torch during generation and transfer of a plasma arc; and
- switching from the pre-flow gas to a plasma gas, and switching from the start shield gas to a primary shield gas after transfer of the plasma arc to a workpiece, wherein the start shield gas has a different composition than the primary shield gas, and mainly that the start shield gas has an ionization energy lower than the primary shield gas.

2. The method according to claim 1, wherein the start shield gas is monatomic.

3. The method according to claim 1, wherein the start shield gas is selected from the group consisting of helium, argon and mixtures thereof.

4. The method according to claim 1, further comprising mixing the pre-flow gas and the start shield gas when the pre-flow gas and the start shield gas exit the plasma arc torch.

5. The method according to claim 1, wherein the plasma arc is transferred to the workpiece without one of a pilot current and a pilot circuit.

6. The method according to claim 1, further comprising applying a single pulse of high voltage energy across an electrode and a tip to generate the plasma arc.

7. The method according to claim 1, wherein the start shield gas has a predetermined ionization energy that is different than the primary shield gas.

8. The method according to claim 7, wherein the ionization energy of the start shield gas is lower than the ionization energy of the primary shield gas.

9. A method of stopping a plasma arc torch, comprising:
- directing a plasma gas into a plasma chamber formed between an electrode and a tip and directing a primary shield gas through a secondary gas passageway of the plasma arc torch during steady-state operation; and
- switching from the primary shield gas to a stop shield gas during ramp down of an operating current, wherein the stop shield gas has a different composition than the primary shield gas, and mainly that the stop shield gas has an ionization energy lower than the primary shield gas.

10. The method according to claim 9, wherein the steady-state operation is selected from the group consisting of cutting, marking, and gouging.

11. The method according to claim 9, wherein the stop shield gas is monatomic.

12. The method according to claim 9, wherein the stop shield gas is selected from the group consisting of helium, argon and mixtures thereof.

13. A method of operating a plasma arc torch, comprising:
- directing a pre-flow gas into a plasma chamber formed between an electrode and a tip and directing a start shield gas through a secondary gas passageway of the plasma arc torch during generation and transfer of a plasma arc;
- switching from the pre-flow gas to a plasma gas, and switching from the start shield gas to a primary shield gas after transfer of the plasma arc to a workpiece, wherein the start shield gas has a composition of gas that is different than the primary shield gas;
- directing a plasma gas into the plasma chamber and directing a primary shield gas through the secondary gas passageway of the plasma arc torch during steady-state operation; and
- switching from the primary shield gas to a stop shield gas during ramp down of an operating current, wherein the stop shield gas has a different composition than the primary shield gas, and mainly that the stop shield gas has an ionization energy lower than the primary shield gas.

14. The method according to claim 13, wherein the start shield gas has a predetermined ionization energy that is different than the primary shield gas.

15. The method according to claim 14, wherein the ionization energy of the start shield gas is lower than the ionization energy of the primary shield gas.

16. The method according to claim 13, wherein the start shield gas and the stop shield gas are the same gas.

17. The method according to claim 13, wherein the start shield gas and the stop shield gas are different gases.

18. The method according to claim 13, wherein the start shield gas and the stop shield gases are monatomic gases.

19. The method according to claim 13, wherein the start shield gas and the stop shield gas are selected from the group consisting of helium, argon and mixtures thereof.

20. The method according to claim 13, wherein the plasma arc is transferred to the workpiece without one of a pilot current and a pilot circuit.

21. The method according to claim 13, further comprising applying a single pulse of high voltage energy across an electrode and a tip to generate the plasma arc.

22. The method according to claim 13, wherein the steady-state operation is selected from the group consisting of cutting, marking, and gouging.

23. A method of starting a plasma arc torch comprising transferring a plasma arc to a workpiece without one of a pilot current and a pilot circuit through the use of directing a pre-flow gas into a plasma chamber formed between an electrode and a tip and directing a start shield gas flow through a secondary gas passageway during generation and transfer of the plasma arc, the start shield gas having a different composition than the primary shield gas, and mainly that the start shield gas has a predetermined ionization energy that is different than a primary shield gas used during steady-state operation.

24. A method of starting a plasma arc torch comprising directing a pre-flow gas into a plasma chamber formed between an electrode and a tip and directing a start shield gas flow through a secondary gas passageway and applying a single pulse of high voltage energy to transfer a plasma arc to a workpiece through the use of the start shield gas flow during generation and transfer of the plasma arc that the start shield gas has a lower ionization energy than a primary shield gas used during steady-state operation and wherein the start shield gas has a different composition than the primary shield gas.

25. A method of reducing electrode wear in a plasma arc torch comprising directing a primary shield gas through a secondary gas passageway and introducing a flow of a stop shield gas through the secondary gas passageway of the plasma arc torch during a current ramp down period, the stop shield gas having a lower ionization energy and a different composition than the primary shield gas used during steady-state operation, wherein the stop shield gas enables the current to be ramped down to a lower level before a plasma arc is extinguished such that molten emissive element material developed in the electrode during steady-state operation is cooled and solidified to reduce ejection of the molten emissive element material from the electrode.

* * * * *